United States Patent Office.

JOHN CARNRICK, OF NEW YORK, N. Y.

PREPARING DIGESTIVE COMPOUNDS.

SPECIFICATION forming part of Letters Patent No. 412,836, dated October 15, 1889.

Application filed June 22, 1889. Serial No. 315,264. (No specimens.)

*To all whom it may concern:*

Be it known that I, JOHN CARNRICK, a citizen of the United States, residing at New York city, in the county of New York and State of New York, have invented certain new and useful Improvements in the Process of Preparing a Digestive Compound, termed "Pancrobilin;" and I do hereby declare the following to be a full, clear, and exact description of the invention, such as will enable others skilled in the art to which it appertains to make and use the same.

This invention relates to the process of preparing a medical compound adapted particularly for causing the digestion and absorption of fatty matters, to aid in converting starchy matter into an assimilable condition, and to promote the digestion of albuminous substances.

The object of the invention is to provide a thorough method of preparing the constituents and uniting them to form a digestive compound for the purpose above mentioned.

More particularly, my object is to prepare in a more efficient manner than heretofore practiced powdered pancreatine, a strong watery solution or infusion thereof, and a preparation of purified bile suitable for admixture with the pancreatine or a solution thereof. To these are added an alcoholic preservative, sugar, and suitable flavoring oils or extracts to form an agreeable liquid compound, which can be readily taken by persons in delicate health or in a debilitated emaciated condition, and by those suffering from constipation and wasting diseases, with the satisfactory result of producing a vigorous healthy tone of the digestive organs, and especially in the alimentary canal, relieving constipation, and causing a rapid increase of fat and flesh in the person using it.

It has been ascertained by experimental research that separately neither the bile nor pancreatic juice is capable of effecting the complete digestion and absorption of fatty substances, but they together act to cause fine division and complete digestion of fatty substances and promote their assimilation. The pancreatic extract digests about forty per cent. of fat, while the prepared bile digests about sixty per cent. of fat when they are administered together in suitable quantity. It has also been ascertained that bile possesses a well-marked anti-fermentative property. The established properties and beneficial action of the bile indicate that it is an important remedial agent when properly combined and administered.

The compound of pancreatine, or watery extract of pancreas, and bile, as prepared in accordance with my invention, not only causes the digestion and absorption of fats, but materially aids the digestion of albuminous substances, and also serves to convert starchy matter into an assimilable condition.

My digestive compound being a mixture of pancreatine and bile, I have for convenience named it "Pancrobilin." In order to prepare it, the fresh sweet-breads (pancreas) in suitable quantity are first carefully dressed by removing with a knife all the adhering fat. They are then chopped fine in a chopping-machine, and the finely-comminuted mass is then digested in alcohol of ninety-five per cent. strength, in the proportion of about forty-five pounds of pancreas to three gallons of alcohol, for a period of about ten hours, for the purpose of loosening, softening, and partially dissolving the fatty matter entangled in its tissue preparatory to its removal. The alcohol also prevents pancreatic digestion of the fatty matter contained in the parenchyma during manipulation of the raw material. The period of maceration having been completed, the mass of pancreas is well pressed to squeeze out the moisture and fat, after which it is carefully dried in the drying-chamber. When well dried, it is reduced to a fine powder, preferably in a roller-mill. It is quite important to remove the fatty matter entangled in the parenchyma of the pancreas, as above described, in order to present the digestive principle in the most active and favorable condition. This operation of removing the fatty matter from the parenchyma of the pancreas and leaving only the fibrous tissue containing the active principle of digestive ferment constitutes a part of the invention in my improved process. This dried powder prepared from the pancreas, as above described, constitutes my pancreatine, and is in proper condition to mix with prepared bile and a suitable excipient to form pills. Two and a half ounces of dry powdered pancreatine represents the substance of twenty-five fresh sweet-breads.

In order to prepare the bile for use in my compound, it is first removed from the gall-sack and then mixed with a suitable proportion of alcohol and allowed to stand about twenty-five hours for the mucus and other impurities to settle, after which the liquid is decanted. This liquid is then filtered through animal or wood charcoal to further purify it, after which it is evaporated to dryness. This purified bile may be used directly in the dry powdered condition in the manufacture of pills.

In order to make my liquid pancrobilin, the powdered pancreatine, prepared as above described, is macerated about twenty-four hours in water, in about the proportion of two and a half ounces of the dry powder to each gallon of the finished liquid, and the mass is agitated and thoroughly beaten till the pancreatine is reduced to a fine pulp and its active digestive principle is fully diffused through and incorporated with the water, forming an active watery solution or infusion of pancreatine. The exhausted fibrous matter and connective tissue are then removed by filtration, or are allowed to settle and the clear liquid decanted.

The operation of forming the watery pancreatic solution or infusion is an important step in my process.

Having prepared my watery solution of pancreatine and purified bile, I mix them together and with other ingredients in about the following proportions for each gallon: pancreatic liquid, eighty parts; alcohol, twenty parts; powdered bile, seventy-two grains; glycyrrhizine, seventy-two grains; sugar, twelve ounces. This mixture is flavored to suit the taste with oils of orange, cassia, coriander, anise, and caraway. Any two or more or all of these oils may be used, as desired. Alcoholic extracts of aromatics may be used, if preferred, for flavoring the pancrobilin. Strong wine, brandy, or other alcoholic spirits may be substituted for alcohol in mixing my liquid digestive compound.

I do not herein claim the product described, that being the subject of my application for patent bearing Serial No. 315,263, filed June 22, 1889.

Having described my invention, what I claim, and desire to secure by Letters Patent, is—

1. The process of preparing a compound for causing the digestion and absorption of fats, albuminous and starchy matters, which consists in treating pancreas or sweet-breads with alcohol and pressure to remove the fatty matter, then agitating the resulting pancreatine in water to form a watery pancreatic solution, purifying bile by treating it with alcohol, filtering through charcoal, and drying, then mixing the bile with a watery solution of pancreas and a suitable preservative.

2. In the manufacture of a digestive compound, the herein-described method of preparing the watery solution of pancreas used therein, which consists in removing the fatty matter from the pancreas or sweet-breads first by mechanical means, then by maceration of the comminuted pancreas in alcohol and subjecting it to pressure, then agitating the resulting fibrous pancreatine in water to impregnate the water with pancreatic extract.

3. In the manufacture of a digestive compound, the herein-described method of preparing the pancreatine used therein, which consists in removing the fatty matter from pancreas or sweet-breads by macerating the comminuted pancreas in alcohol, then subjecting it to pressure to squeeze out the moisture and fat, and then drying to preserve it.

In testimony whereof I affix my signature in presence of two witnesses.

JOHN CARNRICK.

Witnesses:
WM. F. MCPHERSON,
ALLEN CHAMBERLIN.